(12) United States Patent
Ostroverkhov et al.

(10) Patent No.: US 9,373,351 B2
(45) Date of Patent: Jun. 21, 2016

(54) SYSTEM AND METHOD FOR DUAL-BEAM RECORDING AND READOUT OF MULTILAYERED OPTICAL DATA STORAGE MEDIA

(75) Inventors: Victor Petrovich Ostroverkhov, Ballston Lake, NY (US); Kenneth Brakeley Welles, Scotia, NY (US); Brian Lee Lawrence, Niskayuna, NY (US); Xiaolei Shi, Niskayuna, NY (US); Zhiyuan Ren, Malta, NY (US); Mark Cheverton, Mechanicville, NY (US); Ruediger Kusch, Clifton Park, NY (US)

(73) Assignee: General Electric Comany, Schenectady, NY (US)

( * ) Notice: Subject to any disclaimer, the term of this patent is extended or adjusted under 35 U.S.C. 154(b) by 1956 days.

(21) Appl. No.: 12/347,178

(22) Filed: Dec. 31, 2008

(65) Prior Publication Data

US 2010/0165818 A1 Jul. 1, 2010

(51) Int. Cl.
| | | |
|---|---|---|
| *G11B 7/0065* | (2006.01) | |
| *G11B 7/08* | (2006.01) | |
| *G11B 7/09* | (2006.01) | |
| *G11B 7/1369* | (2012.01) | |
| *G11B 7/1378* | (2012.01) | |

(52) U.S. Cl.
CPC .............. *G11B 7/083* (2013.01); *G11B 7/0908* (2013.01); *G11B 7/1369* (2013.01); *G11B 7/1378* (2013.01); *G11B 7/0065* (2013.01); *G11B 7/0927* (2013.01)

(58) Field of Classification Search
CPC ...... G11B 7/00; G11B 7/00772; G11B 7/083; G11B 2220/2504; G11B 7/0065; G11B 2007/240025
See application file for complete search history.

(56) References Cited

U.S. PATENT DOCUMENTS

| | | | | |
|---|---|---|---|---|
| 4,999,810 | A | * | 3/1991 | Vo-Dinh ................ G11B 7/004 365/119 |
| 5,450,218 | A | | 9/1995 | Heanue et al. |
| 5,510,912 | A | | 4/1996 | Blaum et al. |
| 5,727,226 | A | | 3/1998 | Blaum et al. |

(Continued)

FOREIGN PATENT DOCUMENTS

| | | |
|---|---|---|
| JP | 2006268888 A1 | 10/2006 |
| JP | 2007200427 A1 | 8/2007 |

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Srilakshmi K Kumar
*Assistant Examiner* — Carl Adams
(74) *Attorney, Agent, or Firm* — Jean K. Testa; Fletcher Yoder, P.C.

(57) ABSTRACT

A system and method of operating a dual-beam detection system of a holographic data storage disc, including: impinging a data beam on a data layer of the holographic data storage disc; impinging a tracking beam on a tracking element of the holographic data storage disc; detecting a reflection of the tracking beam from the tracking element; and coordinating position of the data beam relative to the tracking beam.

27 Claims, 6 Drawing Sheets

(56) References Cited

U.S. PATENT DOCUMENTS

| | | | |
|---|---|---|---|
| 5,808,998 | A | 9/1998 | Curtis et al. |
| 6,175,317 | B1 | 1/2001 | Ordentlich et al. |
| 6,549,664 | B1 | 4/2003 | Daiber et al. |
| 6,563,779 | B1 | 5/2003 | McDonald et al. |
| 6,711,711 | B2 | 3/2004 | Hwang |
| 6,738,322 | B2 | 5/2004 | Amble et al. |
| 6,889,907 | B2 | 5/2005 | Roh |
| 7,020,054 | B2 | 3/2006 | Kadlec et al. |
| 7,388,695 | B2 | 6/2008 | Lawrence et al. |
| 2005/0136333 | A1 | 6/2005 | Lawrence et al. |
| 2005/0237896 | A1* | 10/2005 | Tachibana ............ G11B 7/0065 369/103 |
| 2005/0286386 | A1* | 12/2005 | Edwards ................. G11B 7/24 369/103 |
| 2006/0073392 | A1 | 4/2006 | Erben et al. |
| 2006/0078802 | A1 | 4/2006 | Chan et al. |
| 2006/0227398 | A1 | 10/2006 | Lawrence et al. |
| 2007/0097469 | A1 | 5/2007 | Erben et al. |
| 2007/0146835 | A1 | 6/2007 | Erben et al. |
| 2008/0055686 | A1 | 3/2008 | Erben et al. |
| 2008/0068959 | A1 | 3/2008 | Saito |
| 2008/0144145 | A1 | 6/2008 | Boden et al. |
| 2008/0144146 | A1 | 6/2008 | Boden et al. |
| 2008/0186812 | A1* | 8/2008 | Takeuchi ............... G11B 7/094 369/44.32 |
| 2009/0080315 | A1* | 3/2009 | Kanamaru ........... G11B 7/0065 369/103 |

FOREIGN PATENT DOCUMENTS

| | | |
|---|---|---|
| JP | 2008097693 A1 | 4/2008 |
| JP | 2008310848 A1 | 12/2008 |
| KR | 10-0626966 B1 | 9/2006 |
| WO | 2008099708 A1 | 8/2008 |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2-5:00.

U.S. Appl. No. 12/347,211, filed Dec. 31, 2008, Xiaolei Shi et al.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

U.S. Appl. No. 12/337,457, Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

U.S. Appl. No. 12/342,794, Dec. 23, 2008, John Anderson Fergus Ross et al.

U.S. Appl. No. 12/343,204, filed Dec. 23, 2008, Ruediger Kusch et al.

U.S. Appl. No. 12/346,279, filed Dec. 30, 2008, Victor Ostroverkhov et al.

U.S. Appl. No. 12/346,378, filed Dec. 30, 2008, Xiaolei Shi et al.

International Search Report issued in connection with corresponding PCT Application No. PCT/US2009/066496 on Mar. 4, 2010.

KR Office Action for KR Application No. 2011-7015066 Mailed Oct. 20, 2015.

\* cited by examiner

SYSTEM AND METHOD FOR DUAL-BEAM RECORDING AND READOUT OF MULTILAYERED OPTICAL DATA STORAGE MEDIA

BACKGROUND

The present techniques relate generally to holographic data storage techniques. More specifically, the techniques relate to methods and systems for dual-beam recording and reading on holographic data storage media or discs.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080 p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, they may be vulnerable to poor tracking control due to the presence of multiple layers of data. Accordingly, techniques that improve tracking control of the disc may be advantageous.

BRIEF DESCRIPTION

An aspect of the invention relates to a method of operating a dual-beam detection system for a holographic data storage disc, including: passing a data beam through a first set of optics to a data layer of the holographic data storage disc; passing a tracking beam through a second set of optics to the holographic data storage disc; detecting a reflection of the tracking beam; and synchronizing positioning of the first set of optics with the second set of optics.

An aspect of the invention relates to a a method of operating a dual-beam detection system of a holographic data storage disc, including: impinging a data beam on a data layer of the holographic data storage disc; impinging a tracking beam on a tracking element of the holographic data storage disc; detecting a reflection of the tracking beam from the tracking element; and coordinating position of the data beam relative to the tracking beam.

An aspect of the invention includes a dual-beam detection system of a holographic data storage disc. The system includes a first optical excitation device configured to provide a data beam at a first wavelength to impinge on data layers of the holographic data storage disc; a second optical excitation device configured to provide a tracking beam at a second wavelength to impinge on a servo plane of the holographic data storage disc; and an optical assembly configured to coordinate a position of the data beam with respect to the tracking beam.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques are directed to coinciding data layers and a tracking layer in holographic data storage systems. Single-bit holographic data storage records data in a plurality of virtual data layers. Initial recording of these virtual layers of micro-gratings benefits from the recording beams to be precisely positioned with respect to a reference point in the medium and to be generally independent of the possible variations due to disk wobble, vibrations, etc. An approach to link the position of the writing and reading beam to the same volume in the bulk is to use surface relief features, such as grooves similar to those in CD-R and DVD disks. A tracking beam (usually of a different wavelength than the data beam) focused on the grooved layer can generate focusing and tracking error signals employable to lock the position of the objective and the beam on the disk via a feedback servo loop. For a discussion of various aspects of holographic data storage, see U.S. Pat. No. 7,388,695, incorporated herein by reference in its entirety.

Figure 1:
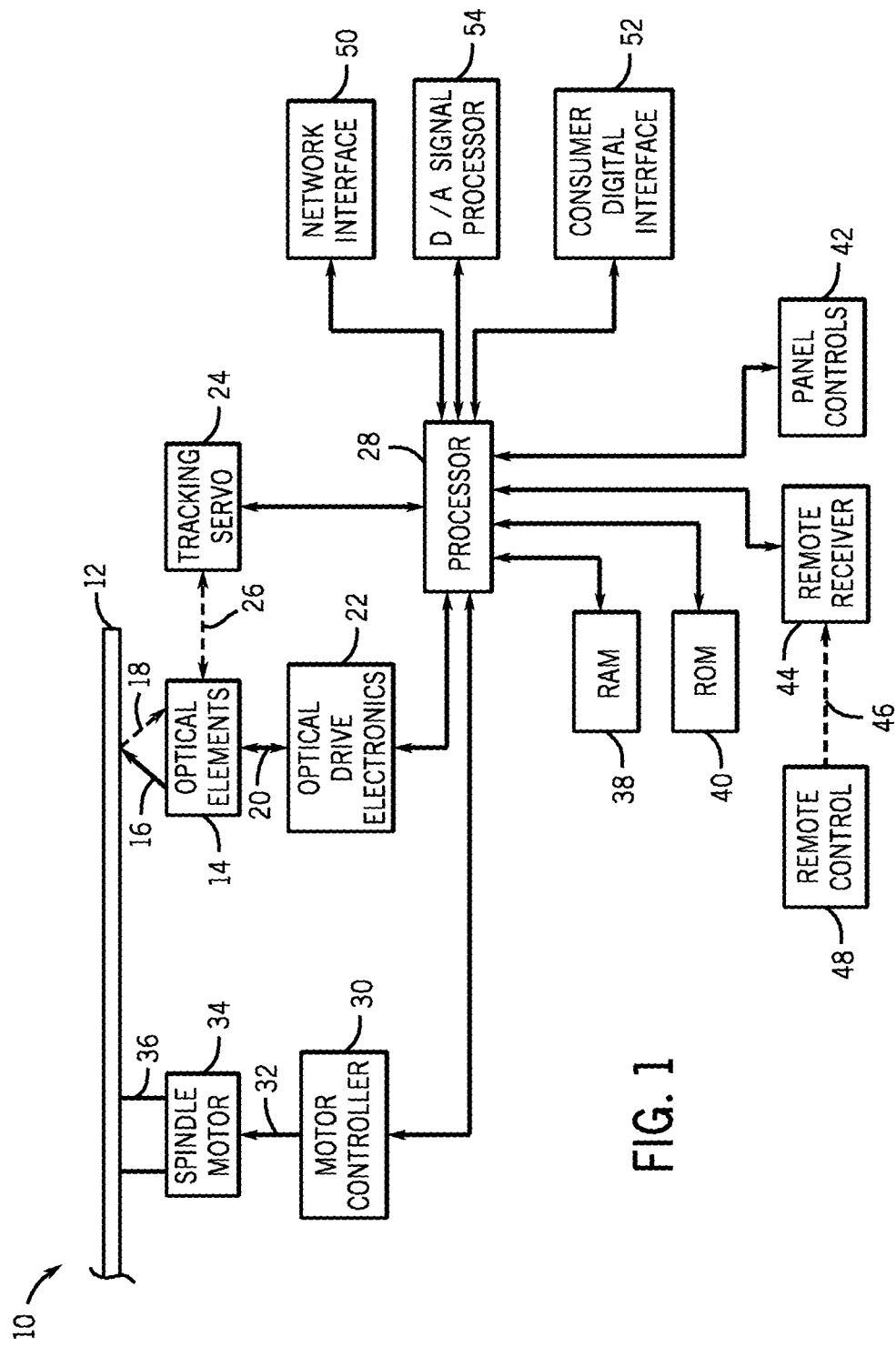
FIG. 1 is a schematic diagram of an optical disc reader in accordance with embodiments of the present technique.

Turning now to the drawings, FIG. 1 is an optical reader system 10 that may be used to read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance and/or amplify the reflection 18 or to reduce interferences of the reflection 18. In some embodiments, the tracking servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
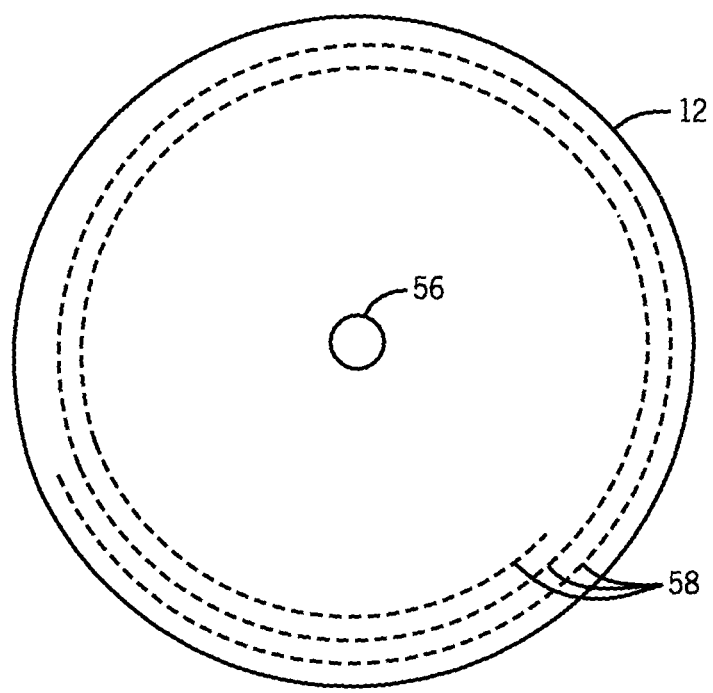
FIG. 2 is a top view of an optical disc in accordance with embodiments of the present technique.

The reader 10 may be used to read an optical data disc 12 containing data as shown in FIG. 2. Generally, the optical data disc 12 is a flat, round disc with one or more data storage layers embedded in a transparent protective coating. The protective coating may be a transparent plastic, such as polycarbonate, polyacrylate, and the like. In the case of a holographic medium, the material of the disk may be functional that actively changes in response to recording light to produce a data mark hologram. The data layers may include any number of surfaces that may reflect light, such as the micro-holograms used for bit-wise holographic data storage or a reflective surface with pits and lands. The optical disk 12 is mounted on the spindle 36 (see FIG. 1) with spindle hole 56 so that the disk may be rotated around its axis. On each layer, the data may be generally written in a sequential spiraling track 58 from the outer edge of the disc 12 to an inner limit, although circular tracks, or other configurations, may be used.

Figure 3:
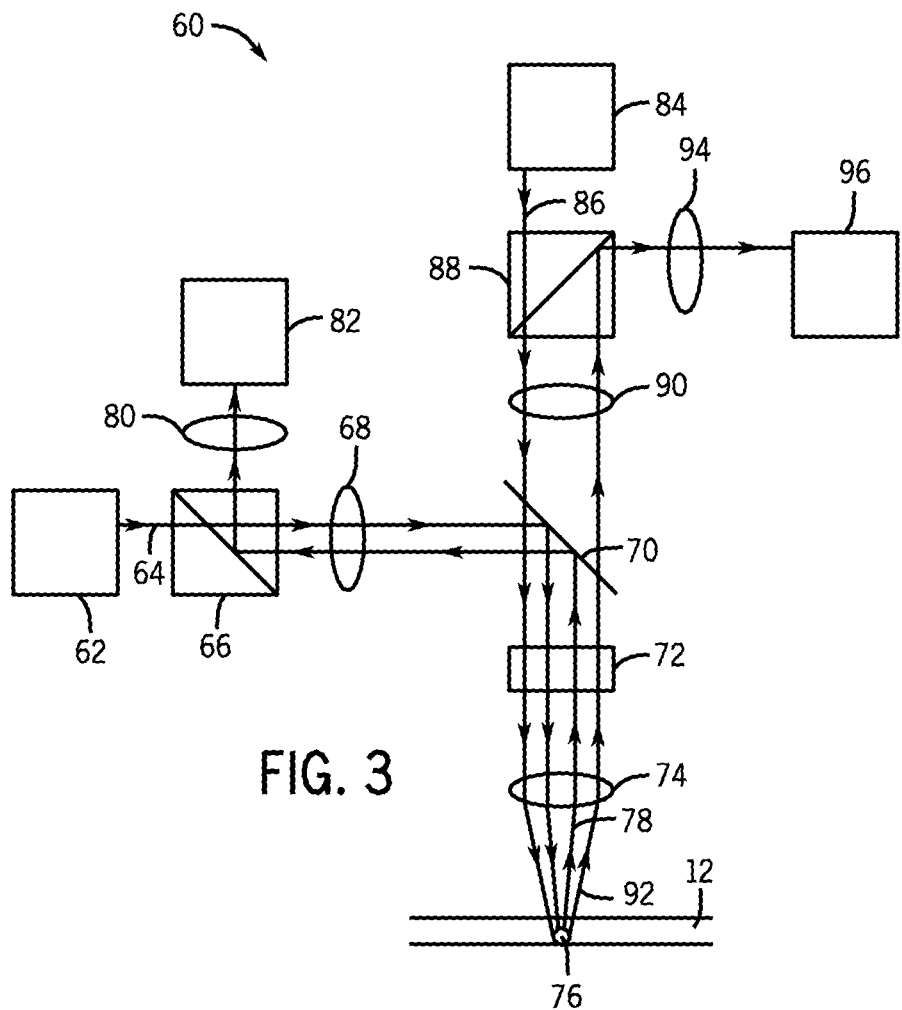
FIGS. 3 and 3A are a schematic diagram of a detection head for multilayered optical data storage media.
Figure 3A:
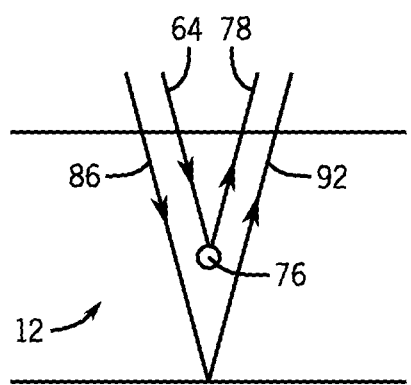

FIGS. 3 and 3A depict an exemplary dual-beam detection head system 60. A light source 62 emits a read beam 64 at a first wavelength which passes through a polarizing beam splitter 66 and depth selecting optics 68. The read beam 64 is reflected off a dichroic mirror 70 and directed through the quarter wave plate 72 and the lens 74 to a micro-hologram 76 in the disc 12. The reflected data beam 78 from the micro-hologram 76 is passed back through the lens 78, quarter wave plate 72, dichroic mirror 70, and depth selecting optics 68. The reflected beam 78 is then passed through the polarizing beam splitter 66, collecting optics 80 and detector 82 where the data of the micro-hologram 76 is read.

Further, a light source 84 emits a tracking beam 86 at a second wavelength which passes through a beam splitter 88 and depth selecting optics 90. The tracking beam 86 passes through the dichroic mirror 70, quarter wave plate 72, and the lens 74 to the disc 12. In the illustrated embodiment, the tracking beam 86 reflects off the disc 12 (e.g., near or at the bottom the disc), which may have a reflective layer, tracks, grooves, and the like. The reflected tracking beam 92 passes through the lens 74, quarter wave plate 72, dichroic mirror 70, collecting optics 90, beam splitter 88, and collecting optics 94 to a detector 96.

In volumetric storage media with a grooved reference plane used for tracking beam positions, one grooved tracking layer is generally sufficient to ensure the positioning of the beam in the medium volume. However, to be able to record multiple layers, the recording and tracking beam focal spots should be separated from each other in depth. When focused on the grooved layer, the tracking beam produces tracking and focusing error signals that facilitate maintaining a repeatable position of the beam with respect to the disk and surface and the track that is being read, generally unaffected by the disk runout. The recording/readout beam should be focused on the virtual data layer in the bulk of the recording medium. To reduce deviations of the reading/writing beam from the track, a favorable scheme would utilize the same objective lens for both tracking and recording/readout beams. This would, in turn, have at least one of the beams to be uncollimated.

However, unfortunately, the relative position of the two focal spots may change when the medium (disc) wobbles around its original position if the objective lens is the only moving element. In other words, the working distance between the lens and medium for a beam focused at a certain depth (layer) is generally independent of the disc position only for a collimated beam. In summary, a focusing servo with a single lens used with a collimated and an uncollimated beam may not ensure that the relative focal spot positions are fixed with respect to each other when a random (unrepeatable) axial runout and/or tilt are present. Different approaches to separating the beam spots in depth may be beneficial.

Using grooved-patterned surface to control focusing and tracking of the objective lens (axial and radial actuator movement), a beneficial design accomodates the objective lens that would separate positions of the focal spots in depth to focus the tracking beam (e.g. red) on the grooved surface, and the recording/readout beam (e.g. green/blue) in the bulk of the medium (disc) on a virtual data layer. With a single-element objective lens, only one collimated beam can typically be used while the other one should be divergent/convergent to focus at a different depth, unless this element is highly dispersive due to the material property or by design. In a more general case, both tracking and data beams may be either convergent or divergent with different divergence cone angles.

Positioning of the read/write beam on a desired data layer and track can be achieved by locking the tracking beam on the groove at the surface (or a special servo-plane) of the disk, while the position of the read/write beam is fixed relative to the tracking beam, and thus to the disk. In order to deterministically write and read data in the volume of the medium when the disk is rotating and wobble and runout occur, the servo system should keep the tracking beam focal spot on the track of the grooved layer, and read/write beams fixed with respect to the tracking beam. This involves axial and radial movements of the optical pickup element (lenses) to follow stochastic changes of the disk position. For a collimated beam, this implies that the distance between the pickup lens and the disk is constant, i.e. the pickup lens will follow the disk movement. When a divergent or convergent beam is focused with the same objective lens, the distance between the focused spot and the lens varies as the lens is moved around to follow the disk wobble.

In one implementation, if the data beam is collimated and the uncollimated beam is used for focusing, the servo loop will keep the focused spot of the tracking beam on the grooved tracking layer of the medium by moving the lens to null the focus error signal (FES). However the distance between the disk and the lens will also change because the conjugate plane of the objective lens is at the finite distance from the lens. This may result in the spot from the collimated data beam to shift with respect to the material of the disk. In another implementation, the tracking beam is collimated so that the servo loop will keep the tracking beam spot on the tracking layer and the distance between the lens and the disk fixed. At the same time, the depth of the data beam spot will vary as the distance between the objective lens and the rest of stationary optics changes.

The present techniques utilize a scheme that may facilitate positioning of the recording beam in the bulk medium at a fixed depth with reduced axial runout. As discussed below, one embodiment utilizes two synchronized actuators to carry two optics elements. Another embodiment employs two different lenses for the tracking and data beams mounted on the same actuator driven by tracking/focusing error signals. Yet another embodiment uses segmented optics and Fresnel-type optics to introduce dispersion into the system and produce different effective focal length of the objective at wavelengths of data and tracking beams. The elements described in the realization may also carry a function of aberration correction for both beams, which could be static or adaptive. Preliminary optical systems modeling shows it is relatively easily realizable for two wavelength system (e.g., 532 nm data and 670 nm tracking beams), i.e., two-color master-slave tracking in single-bit holographic/3D media.

Figure 4:
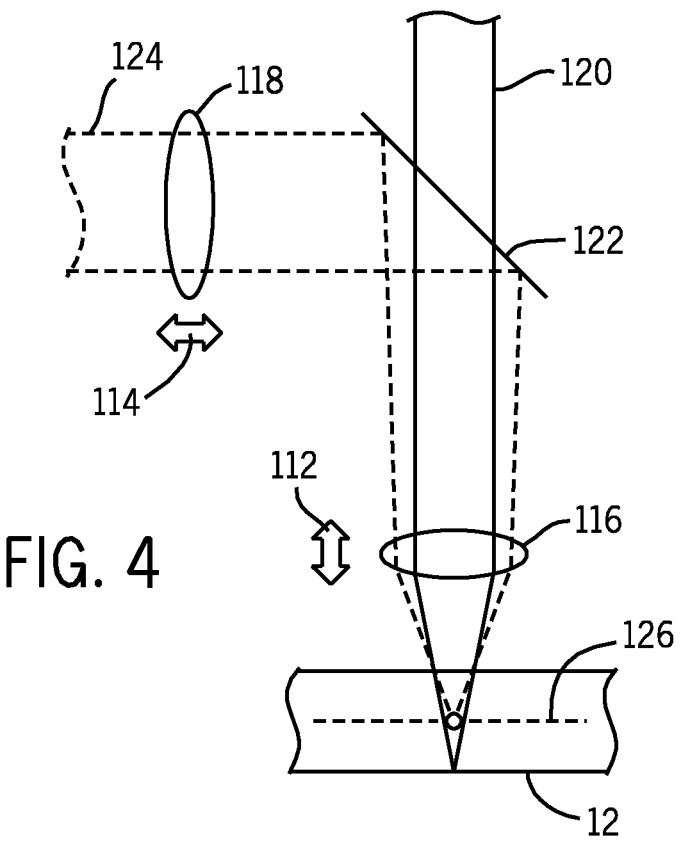
FIG. 4 is a schematic diagram of a detection head for multilayered optical data storage media in accordance with an embodiment of the present techniques.

FIG. 4 depicts a dual-beam detection system 110 having synchronized actuators 112 and 114 for a first lens 116 and a second lens 118. A data beam 120 passes through the second lens 118, a dichroic beam splitter 122, and the first lens 116 to a data layer (126) in the disc 12. A tracking beam 124 passes through the beam splitter 122 and first lens 116 to a tracking grooved layer in the disc 12. Of course, additional optics may be included in the system 110. The data beam 120 and tracking beam 124 are typically of different wavelengths. In the illustrated embodiment, the pair of lenss 116 and 118 may be synchronized in motion with the disc 12. In this example, both beams 120 and 124 can be used originally collimated. The first lens 116 is the objective lens shared by the beams 120 and 124.

The tracking beam 120 is focused on and reflected off the tracking grooved layer of the disk. Focusing and tracking error signals may be generated using reflected tracking beam from the grooved surface and fed into the servo that adjusts the position of the first lens 116 to compensate the wobble of the disk 12. The data beam 124, in order to be collected at a different depth in the disk 12 (closer to the lens 116 in this example) passes through a second lens 118, the dichroic beam splitter 122, and enters the first lens 116 with convergent rays. One of the beams (in this example, the data beam 124) enters through both lenses 116 and 118, while the other beam (e.g., the tracking beam 120) enters the system between the two lenses 116 and 118 (via a dichroic beam splitter 122, etc.) and typically only passes through the objective lens 116. Thus, advantageously, the focal spots of the two beams 120 and 124 lie at different depths. However, as the disk 12 rotates and wobbles, the depths of the data beam focus spot may vary with respect to that of the reference beam. This will result in a deviation (in depth or laterally) of the focused data beam 124 from the micro-hologram 76 in a data layer 126 that is being read. This deviation can be compensated by a movement of the second lens 118 to follow (with a proper scaling) the movement of the first lens 116.

In view of the foregoing, the synchronized movement of optics containing uncollimated beams "decouples" the motion of the disc. Both the first and the second lenses 116 and 118 may function as aberration compensating optics for the tracking beam 120 and data beam 124. The second lens 118 as well as possible additional adaptive optics elements may function also as a working depths selector to address different data layers 126 in the disk 12. Although only the beam depth compensation was used here as an example, a similar runout compensation in the radial and/or tangential directions may be implemented to compensate the corresponding deviations between the data beam and the tracking beam focus positions.

Figure 5:
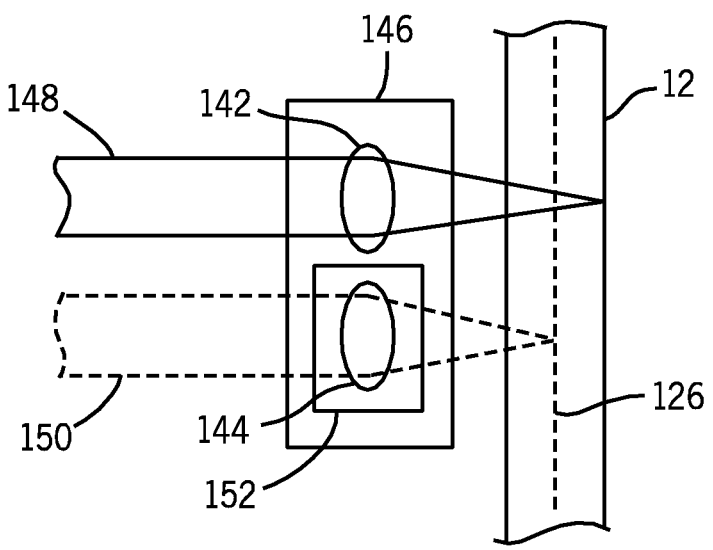
FIG. 5 is a schematic diagram of a detection head for multilayered optical data storage media in accordance with an embodiment of the present techniques.

In another embodiment, FIG. 5 depicts a dual-beam detection system 140 having two lenses 142 and 144 integrated into a single actuator 146. The system 140 facilitates collimated operation for both the tracking beam 148 and the data beam 150. In this instance, the pair of discrete lenses or lens assemblies 142 and 144 may be designed respectively for wavelengths/depths of the tracking beam 148 and data (read/write) beam 150, and which, again, the lenses 142 and 144 are mounted on a common actuator 146. In the illustrated embodiment, the tracking beam 148 passes through lens 142 to a guide groove on the disc 12. The data beam 150 passes through the lens assembly 144 to a data layer 126 in the disc 12. The lens assembly 144 used to focus the data beam 150 may be designed to have an adjustable focus length, as indicated by reference numeral 152, so that different data layers 126 can be accessed. Of course, additional optics may generally be included that, for example, statically or dynamically compensate aberrations. As the disk 12 rotates and undesirably wobbles, the actuator 146 adjusts the position of both tracking and data optics (142 and 144) in the same way to accurately follow the reference grooves that facilitates that the data layers and bits are correctly accessed with the data beam 150. Additional disk tilt detection and feedback can be applied to the moving part of the actuator.

Figure 6:
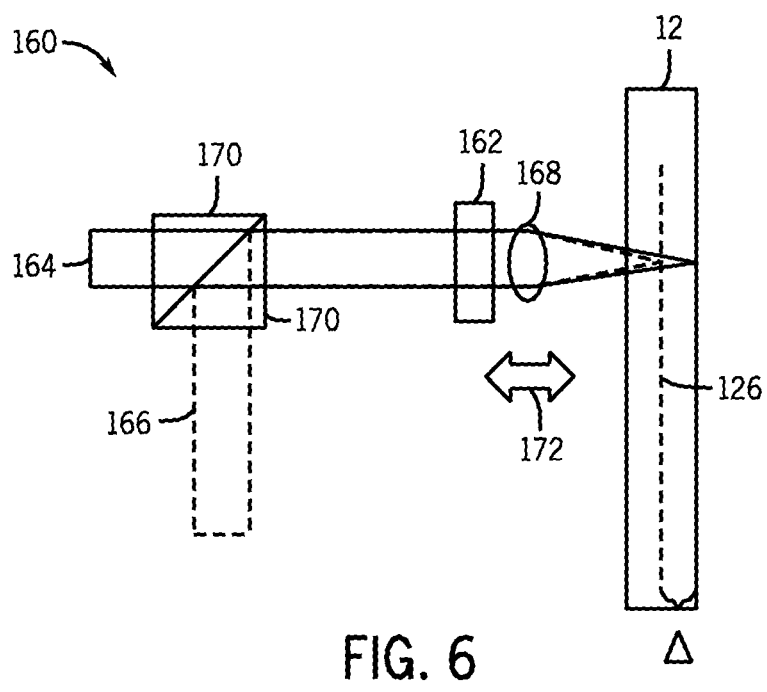
FIG. 6 is a simplified schematic of a detection head for multilayered optical data storage media in accordance with an embodiment of the present techniques.

In yet another embodiment, FIG. 6 depicts a dual-beam detection system 160 having a dispersive element 162. In this example, the dispersive element 162 (e.g., a dye-doped plate with dye distribution profile) is configured to change the focal length of a beam at one wavelength without significantly affecting another beam at a different wavelength. The single-element 162 may exhibit significant dispersion either due to structural design such as Fresnel phase plate, or a dispersive element such as non-uniformly distributed dye or liquid crystal transparent to one of the beams 164 or 166, but resonantly interacting with the other. In the illustrated embodiment, the tracking beam 164 passes through the dispersive element 162 and lens 168 to a tracking or guide element on the disc 12. The data beam 166 reflects from a beam splitter 170, passes through the dispersive element 162, and lens 168 to data layers 126 on the disc 12. An actuator 172 facilitates positioning of the system 160.

In sum, the dispersive element 162 may provide for a highly different refractive index for the tracking beam 164 (e.g., red wavelength) versus the data beam 166 (e.g., green or blue wavelength). Indeed, the element 162 may provide for high chromatic separation. The described dispersive property may be incorporated into the lens 168. Moreover, the dispersive properties of the dispersive element may be tunable, such as via an electro-chromic effect. Lastly, this example of FIG. 6 may also include additional optics and actuators similar to those, for example, mentioned with respect to FIG. 4. Such additional optics may facilitate the selecting of different data layers and compensating for the residual runout difference between the data beam and the tracking beam, for example.

Figure 7:
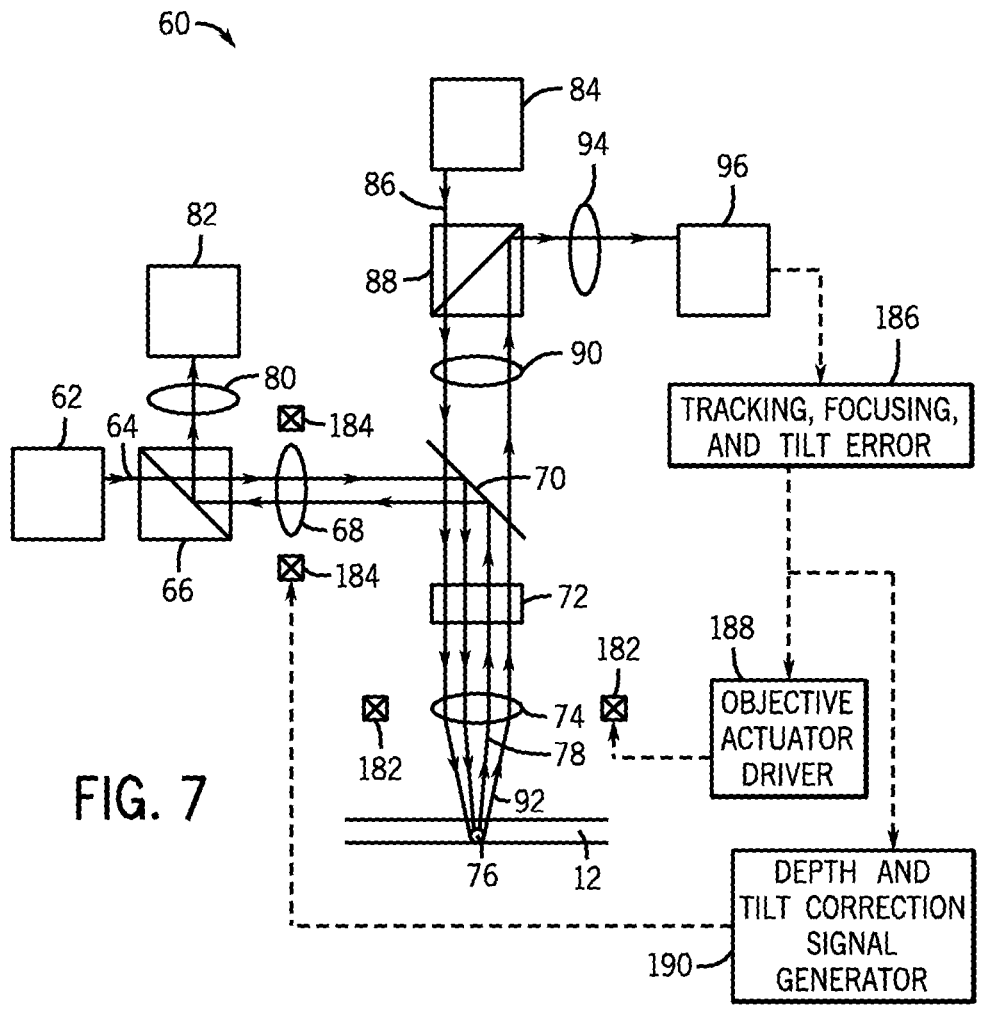
FIGS. 7 and 7A are a schematic diagram of the detection head of FIGS. 3 and 3A employing synchronized actuators as discussed with respect to FIG. 4 in accordance with an embodiment of the present techniques.
Figure 7A:
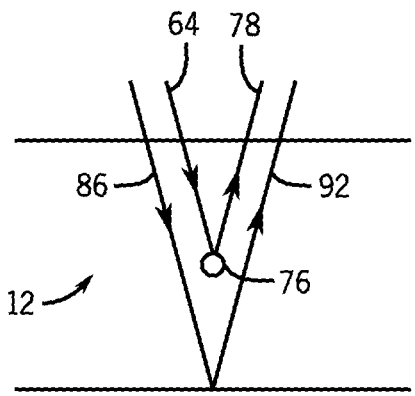

FIGS. 7 and 7A depicts the detection head of FIGS. 3 and 3A employing synchronized actuators as discussed with respect to FIG. 4. A dual-beam detection system 180 having synchronized actuators 182 and 184 is illustrated. A block diagram of a control scheme is also depicted. In this example, the detector 96 that reads the reflected tracking beam 92 feeds a signal to a controller 186 for tracking error, focusing error, and tilt error. The controller 186 provides a control signal an objective actuator driver 188 and also to a depth and tilt correction signal generator 190. The objective actuator driver 188 controls the actuator 182, and the depth and tilt correction signal generator 190 controls the actuator 184. The shared objective lens 74 may incorporate dispersive beam separation as described with respect to FIG. 6.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a dual-beam detection system for a holographic data storage disc, comprising:
    passing a data beam through a first set of optics to a data layer at a first depth of the holographic data storage disc;
    passing a tracking beam through a second set of optics to a second depth of the holographic data storage disc;
    detecting a reflection of the tracking beam;
    synchronizing positioning of the first set of optics with the second set of optics; and
    adjusting a focus of the data beam to maintain the focus of the data beam at the first depth.

2. The method of claim 1, wherein the tracking beam is passed through the second set of optics to a tracking element on the holographic data storage disc.

3. The method of claim 2, wherein the tracking element comprises a groove on the holographic data storage disc.

4. The method of claim 1, comprising feeding a signal correlative to the detection of the reflective tracking beam to a servo control loop of the dual-beam detection system.

5. The method of claim 1, wherein synchronizing comprises synchronizing a pair of actuators in the dual-beam detection system.

6. The method of claim 1, wherein synchronizing comprises synchronizing actuation of a first lens with actuation of a second lens, wherein the first lens focuses the data beam on the data layer and the tracking beam on the tracking layer, and wherein the second lens functions as a data-layer depth selector.

7. The method of claim 1, wherein synchronizing comprises synchronizing movement of a pair of lenses in the dual-beam detection system.

8. The method of claim 1, wherein synchronizing comprises synchronizing focusing of the data beam on the data layer with focusing of the tracking beam on a tracking element of the holographic data storage disc.

9. A method of operating a dual-beam detection system of a holographic data storage disc, comprising:
impinging a data beam on a data layer at a first depth of the holographic data storage disc;
impinging a tracking beam on a tracking element at a second depth of the holographic data storage disc;
detecting a reflection of the tracking beam from the tracking element; and
coordinating a position of the data beam relative to the tracking beam such that the data beam is focused on the data layer at the first depth.

10. The method of claim 9, comprising locking the tracking beam on the tracking element.

11. The method of claim 9, wherein the tracking element comprises a servo plane of the holographic data storage disc.

12. The method of claim 9, wherein the tracking element comprises a groove on the holographic data storage disc.

13. The method of claim 9, wherein coordinating comprises fixing position of the data beam relative to the tracking beam.

14. The method of claim 9, wherein impinging a tracking beam on a tracking element comprises accounting for wobble in one or more directions of the holographic data storage disc.

15. The method of claim 9, wherein coordinating position of the data beam relative to the tracking comprises axial and radial movements of optical pickup elements of the dual-beam detection system to follow stochastic changes of the disc position.

16. The method of claim 9, wherein coordinating position of the data beam relative to the tracking comprises synchronizing an actuator of a first lens with an actuator of a second lens.

17. The method of claim 9, wherein coordinating position of the data beam relative to the tracking comprises employing a first lens assembly for the tracking beam and a second lens assembly for the data beam, and wherein the first lens and the second lens are mounted on the same actuator.

18. The method of claim 17, wherein the actuator is driven by tracking error signal, a focusing error signal, or a tilt error signal, or any combination thereof.

19. The method of claim 9, wherein coordinating position of the data beam relative to the tracking comprises passing the tracking beam or data beam, or both, through a dispersive element.

20. The method of claim 9, wherein coordinating position of the data beam relative to the tracking beam comprises passing the tracking beam and data beam through a lens and a dispersive element, wherein the dispersive element introduces dispersion to produce a focal length of the data beam that is different than a focal length of the tracking beam.

21. A dual-beam detection system of a holographic data storage disc, comprising:
a first optical excitation device configured to provide a data beam at a first wavelength to impinge on data layers of the holographic data storage disc;
a second optical excitation device configured to provide a tracking beam at a second wavelength to impinge on a servo plane of the holographic data storage disc; and
an optical assembly configured to coordinate a position of the data beam with respect to the tracking beam and configured to coordinate a focus depth of the data beam with respect to the tracking beam.

22. The system of claim 21, wherein the optical assembly comprises:
a first lens configured to focus the data beam the data layers of the holographic data storage disc;
a second lens configured to focus the tracking beam on the servo plane of the holographic data storage disc; and
an actuator mechanism configured to synchronize movement of the first lens with movement of the second lens.

23. The system of 22, wherein the actuator mechanism comprises a first actuator for the first lens and a second actuator for the second lens, and wherein a servo control loop synchronizes the first actuator with the second actuator.

24. The system of claim 22, wherein the actuator mechanism comprises an actuator, and wherein the first lens and the second lens are mounted on the actuator.

25. The system of claim 21, wherein the servo plane comprises grooves.

26. The system of claim 21, wherein the optical assembly comprises:
a lens configured to focus the data beam on the data layers of the holographic data storage disc and to focus the tracking beam on the servo plane of the holographic data storage disc, wherein the first wavelength is different than the second wavelength; and
a dispersive element configured to change a focal length of the data beam or the tracking beam.

27. The system of claim 26, wherein dispersive properties of the dispersive element are tunable.

* * * * *